UNITED STATES PATENT OFFICE.

WILLIAM E. MILLER, OF RENTON, WASHINGTON.

COMPOSITION FOR RUBBER-FINISH AND PROCESS.

1,400,090.   Specification of Letters Patent.   Patented Dec. 13, 1921.

No Drawing.   Application filed September 1, 1921.   Serial No. 497,661.

*To all whom it may concern:*

Be it known that I, WILLIAM E. MILLER, a citizen of the United States, residing at Renton, in the county of King and State of Washington, have invented certain new and useful Improvements in Compositions for Rubber-Finish and Process; and I do hereby declare the following to be a full, clear, and exact description of the invention, such as will enable others skilled in the art to which it appertains to make and use the same.

This invention relates to the process of manufacturing a composition from various ingredients for a rubber finishing composition, and to the composition as completed.

The objects of this invention are to provide a method for mixing together certain ingredients in a particular manner, and which when so mixed will form a composition of value for use on the surfaces of cloth, leather, rubber, etc.

Another object is to provide a composition of certain ingredients and constituents, which when properly combined will produce a rubberized surface on the materials to which it may be applied.

My product is particularly important for the covering and resurfacing of various forms of automobile tops, hand bags, leather and imitation of leather, and other surfaces which are desirably made water proof and with a neatly appearing exterior.

In order to properly prepare and combine the essential ingredients for the purposes mentioned, I use them in the following manner, with the following proportions of each:

One part of rubber, such as old automobile casings, or other good quality of rubber, to which I add three parts of silicate of sodium commonly called water glass, and I then boil these together for a short time or until the rubber has been dissolved and combined with the added matter, and this fluid is then cooled and five parts of raw linseed oil, and one part of a drier commonly called Japan drier is added and thoroughly mixed, with another part of lamp black, or other desired coloring according to the use to which the composition is to be applied.

This composition when thinly spread over the surface to be covered produces a smooth even surface coating of glossy and water proof condition, and will not crack or injure the material covered.

Claims—

1. A process consisting of mixing rubber with silicate of sodium and boiling the mixture until the rubber is dissolved and combined, and then adding raw linseed oil with a suitable drier and a coloring substance.

2. A composition consisting of rubber, silicate of sodium, raw linseed oil and drier substance with a coloring element.

3. A composition consisting of one part rubber, three parts silicate of sodium, five parts raw linseed oil, one part Japan drier and one part lamp black.

In testimony whereof I affix my signature.

WILLIAM E. MILLER.